United States Patent
Coiro, Sr. et al.

(10) Patent No.: US 6,408,794 B1
(45) Date of Patent: Jun. 25, 2002

(54) DEVICE FOR DISPLAYING AN AIR FLOW CONDITION IN A RACK FOR ANIMAL CAGES

(75) Inventors: Michael A. Coiro, Sr., Jacobstown; Frank J. Herdt, Bordentown; Brian M. Bilecki, Trenton, all of NJ (US)

(73) Assignee: Allentown Caging Equipment Co., Inc., Allentown, NJ (US)

( * ) Notice: Subject to any disclaimer, the term of this patent is extended or adjusted under 35 U.S.C. 154(b) by 0 days.

(21) Appl. No.: 09/693,156

(22) Filed: Oct. 20, 2000

(51) Int. Cl.[7] .................................................. A01K 1/00
(52) U.S. Cl. ........................................................ 119/418
(58) Field of Search ................................ 119/416, 418, 119/455, 419, 420, 448, 500; 454/61, 238; 165/11.1

(56) References Cited

U.S. PATENT DOCUMENTS

| | | | |
|---|---|---|---|
| 4,249,482 A | 2/1981 | Harr | 119/17 |
| 4,343,261 A | 8/1982 | Thomas | 119/15 |
| 4,365,590 A | 12/1982 | Ruggierie et al. | 119/15 |
| 4,402,280 A | 9/1983 | Thomas | 119/15 |
| 4,528,941 A | 7/1985 | Spengler | 119/15 |
| 4,591,093 A * | 5/1986 | Elliot, Jr. | 165/11.1 |
| 4,690,100 A | 9/1987 | Thomas | 119/15 |
| 5,000,120 A | 3/1991 | Coiro, Sr. et al. | 119/15 |
| 5,048,459 A | 9/1991 | Niki et al. | 119/17 |
| 5,179,524 A * | 1/1993 | Parker et al. | 165/217 |
| 5,307,757 A | 5/1994 | Coiro, Sr. et al. | 119/17 |
| 5,429,800 A * | 7/1995 | Miraldi et al. | 119/418 |
| 5,513,596 A | 5/1996 | Coiro, Sr. et al. | 119/457 |
| 5,676,596 A * | 10/1997 | Masek | 119/448 |
| 5,951,394 A * | 9/1999 | Pariseau | 454/238 |

* cited by examiner

Primary Examiner—Yvonne R. Abbott
(74) Attorney, Agent, or Firm—Mathews, Collins, Shepherd & McKay, P.A.

(57) ABSTRACT

The present invention relates to a device for displaying a condition of air flow to or from a ventilated rack of animal cages in which a damper is coupled between the ventilated rack and an air inlet or exhaust outlet. Air pressure is measured within the damper. A condition of the measured pressure is visually displayed. The display can include a plurality of color coded portions for indicating that the condition is within or outside of a preferred operating range, thereby providing a visual assurance that the ventilated rack of animal cages is maintaining a barrier condition. In addition, the display can indicate a value of the measured pressure or a flow rate. When the display indicates that the condition of the air flow is outside of the preferred operating range, the damper can be manually or automatically adjusted to enable the preferred operating range to be obtained. A barrier condition of the rack is maintained when the preferred operating range is maintained.

25 Claims, 5 Drawing Sheets

DEVICE FOR DISPLAYING AN AIR FLOW CONDITION IN A RACK FOR ANIMAL CAGES

BACKGROUND OF THE INVENTION

1. Field of the Invention

The present invention relates to a device for providing a visual display of a condition of air flow to or from a ventilated rack of animal cages.

2. Description of the Related Art

Systems for providing air and removing exhaust from racks containing animal cages are known. U.S. Pat. No. 5,307,757 describes a ventilated animal rack and animal cage system including a forced air system in which positive air is supplied by an air inlet manifold. Air is removed from the cage by negative air pressure to an exhaust manifold. The exhausted air is treated with a laboratory air treatment system or portable HEPA filtered exhaust unit and is released to the atmosphere.

Alternatively, exhaust for a rack of animal cages is removed by a central exhaust system. Several racks can be connected to the exhaust system. One end of an exhaust drop is connected to a duct of the exhaust system for removing exhaust. The other end of the drop is connected to an exhaust plenum of the rack of animal cages. The exhaust operates by negative pressure. Air is supplied to the ventilated rack by a central system or with a rack mounted supply blower. A conventional damper has been used to permit air flow to or from the rack to be adjusted and measured at one location. The damper is attached to a drop of either the exhaust system or the air flow system. An example of a conventional damper is manufactured by Continental Fan Manufacturing as an Iris Damper SP1-100. Interlocking steel plates and a calibrated control lever form an adjustable aperture. A pair of pressure ports extend from either side of the aperture of the damper. By measuring differential pressure across the pressure ports and referring to a graph of a matching performance curve, an air flow rate can be determined. Thereafter, the damper can be adjusted to adjust the air flow rate.

It is desirable to provide a device for automatically providing a visual verification of proper air flow to or from a ventilated rack of animal cages, thereby assisting in assessing a barrier condition of the ventilated rack.

SUMMARY OF THE INVENTION

The present invention relates to a device for displaying a condition of air flow to or from a ventilated rack of animal cages in which a damper is coupled between the ventilated rack and an air inlet or exhaust outlet. Air pressure is measured within the damper. A condition of the measured pressure is visually displayed. The display can include a plurality of color coded portions for indicating that the condition is within or outside of a preferred operating range, thereby providing a visual assurance that the ventilated rack of animal cages is maintaining a barrier condition. In addition, the display can indicate a value of the measured pressure or a flow rate. When the display indicates that the condition of the air flow is outside of the preferred operating range, the damper can be manually or automatically adjusted to enable the preferred operating range to be obtained. A barrier condition of the rack is obtained when the preferred operating range is maintained

BRIEF DESCRIPTION OF THE DRAWINGS

For a better understanding of the present invention, reference may be made to the accompanying drawings.

DETAILED DESCRIPTION

Figure 1:
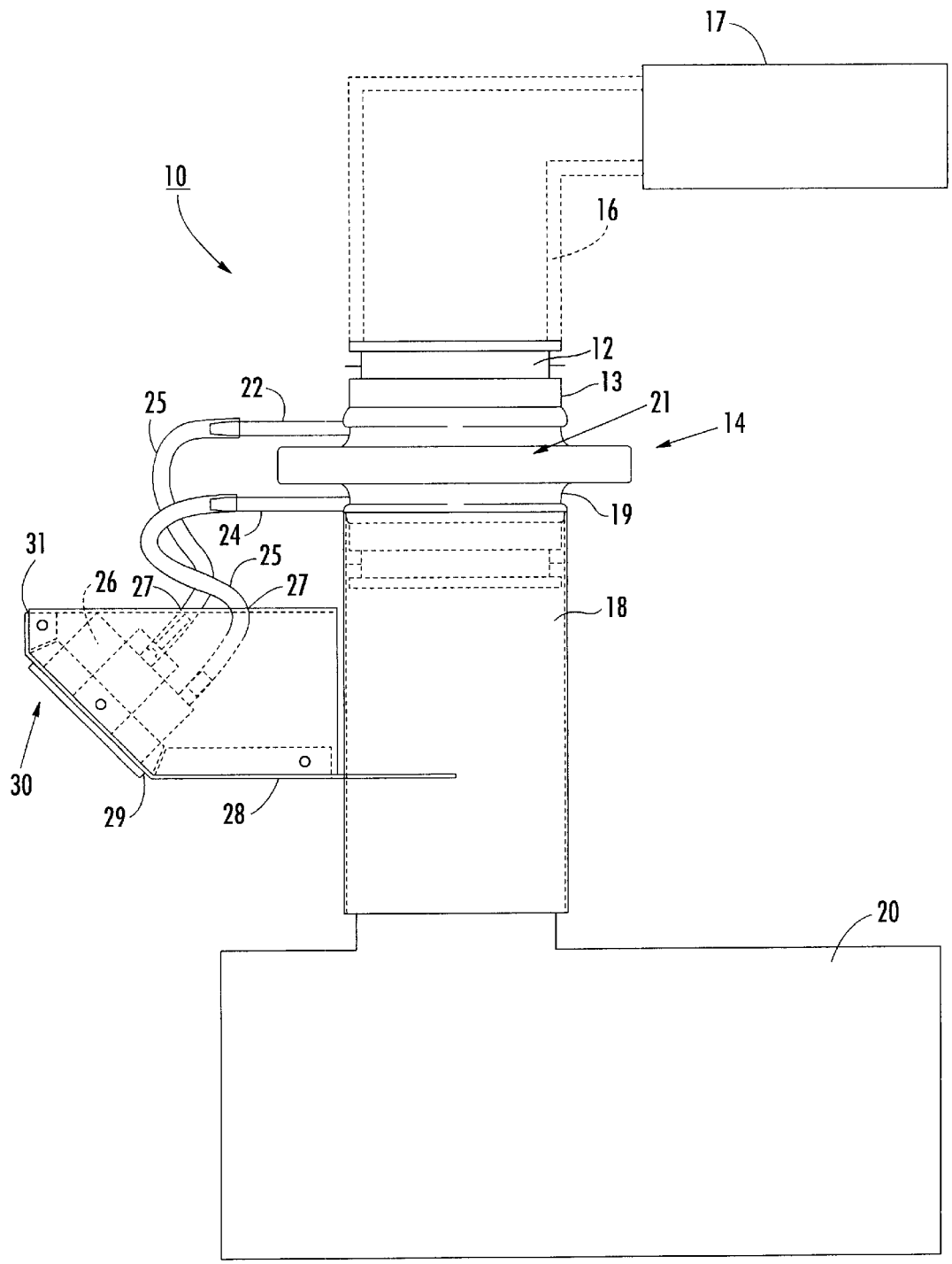
FIG. 1 is a side perspective view of a device for displaying an air flow condition to or from a ventilated rack of animal cages.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a side elevational view of a device for displaying a condition of air flow to or from a rack for animal cages 10. Upper housing 12 connects to upper end 13 of damper 14. Upper housing 12 attaches to drop 16. At least one drop 16 is connected to central exhaust and air supply system 17. Drop 16 receives air supply or supplies exhaust to central exhaust and air supply system 17. Lower housing 18 attaches to lower end 19 of damper 14. Lower housing 18 connects to ventilated rack of animal cages 20.

Damper 14 includes means for adjusting air flow rate 21, thereby adjusting the air flow to or from ventilated rack of animal cages 20, as described below. Upper pressure port 22 extends from upper end 13 of damper 14. Lower pressure port 24 extends from lower end 19 of damper 14. Tubing 25 connect upper pressure port 22 and lower pressure port 24 to differential pressure gauge 26. Differential pressure gauge 26 measures differential pressure between air pressure of upper pressure port 22 and air pressure of lower pressure port 24. For example, differential pressure gauge 26 can be a magnehelic differential pressure gauge as manufactured by Dwyer as P/N # 2-5002.

Differential pressure gauge 26 is positioned within gauge housing 28. Gauge housing 28 is attached to lower housing 18. Tubing 25 extends through apertures 27 in gauge housing 28. Display 30 is attached to end 29 of housing 28. Display 30 displays a condition of measured differential pressure from differential pressure gauge 26. Preferably end 29 is angled from top surface 31 of housing 28 thereby providing a view of display 30 from beneath device 10.

Figure 2:
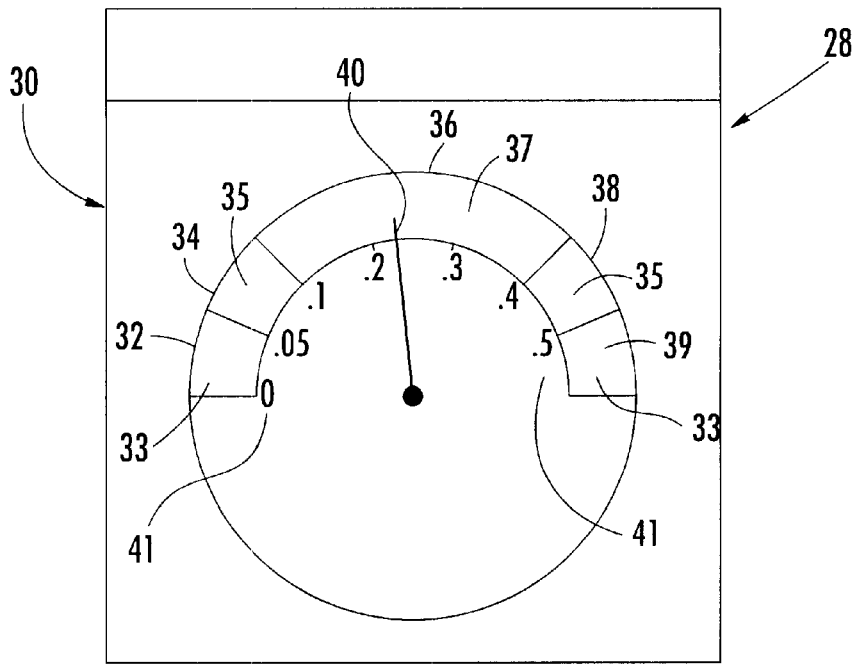
FIG. 2 is a front plan view of a display of the device.

Display 30 can include a plurality of colored portions corresponding to conditions of measured differential pressure, as shown in FIG. 2. For example, portion 32 has first color 33, portion 34 has second color 35, portion 36 has third color 37, portion 38 has second color 35 and portion 39 has first color 33. Portion 32, portion 34, portion 36, portion 38 and portion 39 are calibrated to correspond to a range of measured differential pressure representing a predetermined condition. A suitable first color 33 is red indicating that the condition of the differential pressure measurement is either higher or lower than a preferred operating range of differential pressures, and is outside of the preferred operating range of differential pressures. A suitable second color 35 is yellow indicating that the condition of the differential pressure measurement is at the edge of the operating range or slightly outside of the operating range. A suitable third color 37 is green indicating that the condition of the differential pressure is within the operating range. Needle 40 moves between portion 32, portion 34, portion 36, portion 38 and portion 39 to indicate which portion of display 30 corresponds to the differential pressure measurement. Display 30 can also include indicia 41 of numerical values corresponding to the differential pressure measurements. For example, indicia 41 can be in the range of about 0 to about 0.50 inches-of water.

Figure 3:
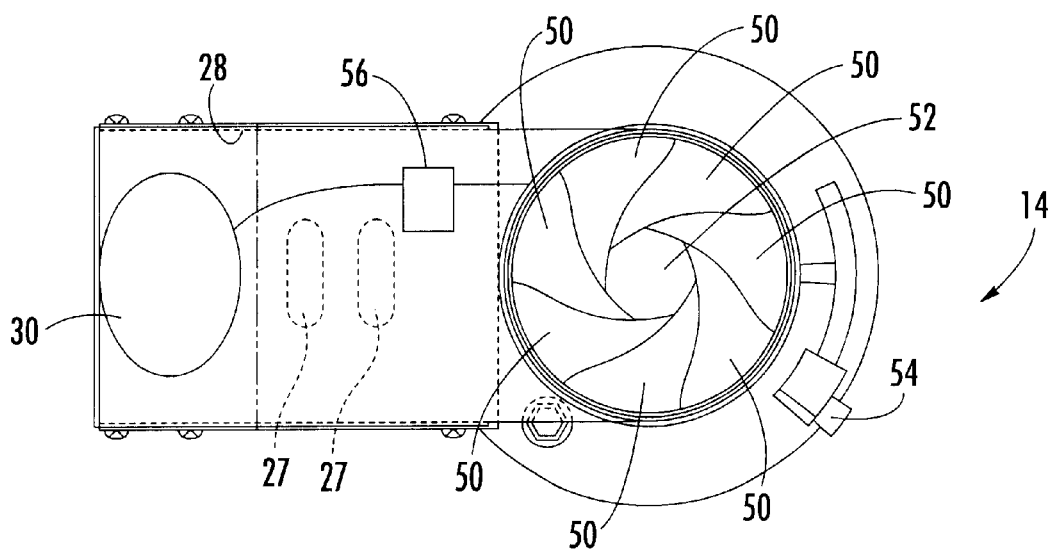
FIG. 3 is a top and side perspective view of the device not including tubing for connecting a pressure gauge to the damper.

FIG. 3 illustrates a top view of damper 14 and gauge housing 28. Means for adjusting air flow rate 21 includes a plurality of interlocking plates 50. Interlocking plates 50 are moved inwardly or outwardly to control the size of aperture 52, thereby adjusting the flow rate within damper 14. The flow rate within damper 14 can be adjusted with means for adjusting flow rate 21 based on the displayed measurement on display 30. For example, if needle 40 indicates a condition of the pressure measurement outside of the operating range, means for adjusting flow rate 21 can be adjusted to increase or decrease the flow rate into ventilated rack of animal cages 20, thereby maintaining a barrier condition of ventilated rack of animal cages 20. A suitable damper is manufactured by Continental Fan Manufacturing, Buffalo, N.Y., as SP-100. Means for adjusting flow rate 21 can be manually adjusted using lever arm 54 connected to interlocking plates 50. Alternatively, control 56 can be connected between means for adjusting flow rate 21 and display 30. Control 56 can be used to automatically control adjustment of interlocking plates 50 depending on a determined condition shown on display 30. Preferably upper housing 12, damper 14, gauge housing 28 can be formed of stainless steel. It will be appreciated that other means for adjusting flow rate 21 can include other conventional dampers and devices used for controlling air flow rate.

Figure 4:
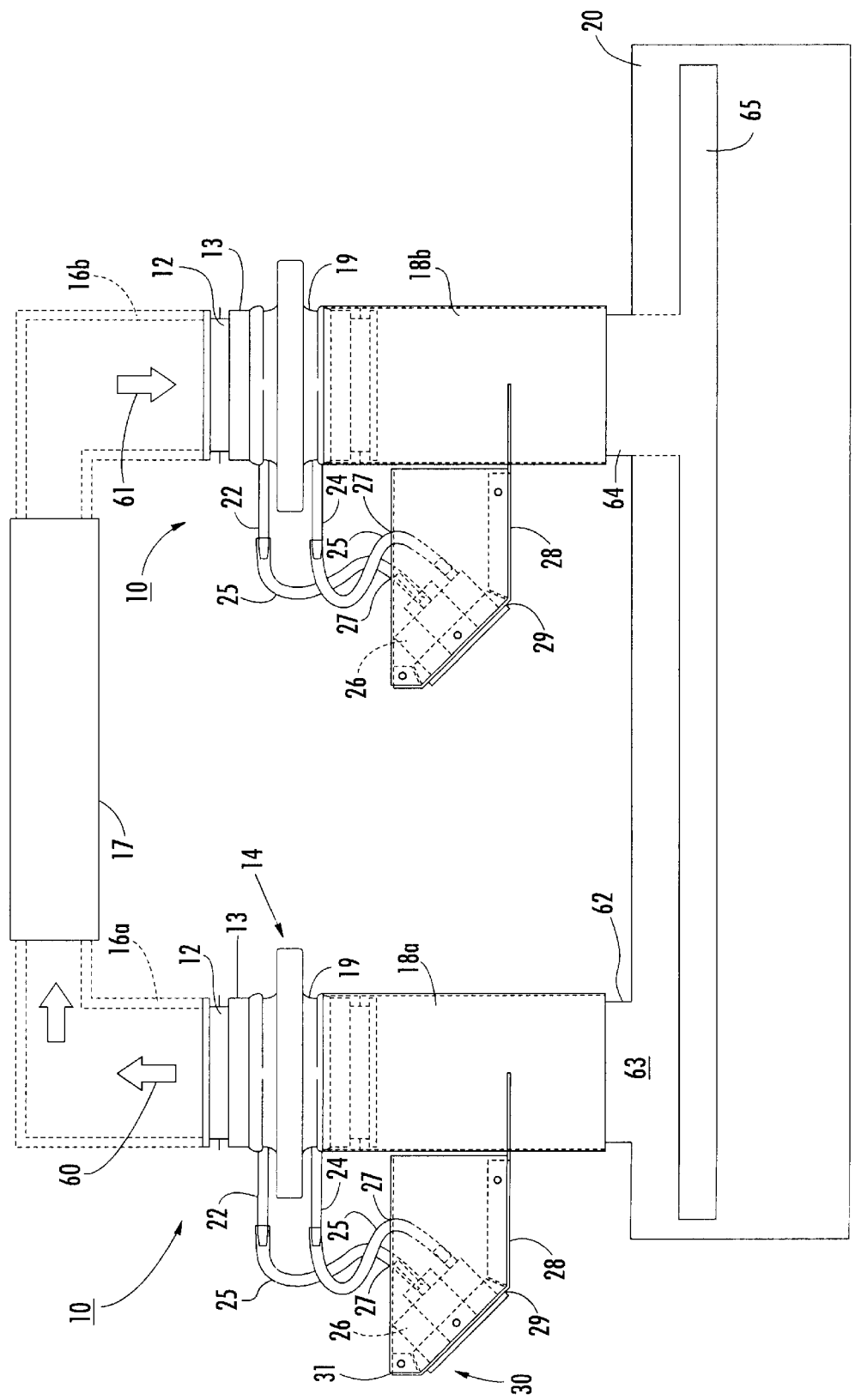
FIG. 4 is a perspective view of a pair of devices connected to a central exhaust and air supply system.

FIG. 4 illustrates an implementation of a pair of devices 10 in connection with central exhaust and air supply system 17. Drops 16a and 16b are connected to central exhaust and air supply system 17. Central exhaust and air supply system 17 receives exhaust 60 from drop 16a and supplies air 6 to the drop 16b. In alternate embodiments of central exhaust and air supply system 17, more than one pair of drops 16 can be connected to central exhaust and air supply system 17. Alternatively, central exhaust and air supply system 17 can include only drops 16a for receiving exhaust 60 or drops 16b for supplying air 61.

Lower housing 18a connects to exhaust outlet 62 of ventilated rack of animal cages 20.

Exhaust outlet 62 connects to exhaust plenum 63. Lower housing 1 8b connects to air inlet 64 of ventilated rack of animal cages 20. Air inlet 64 connects to air inlet plenum 65. Exhaust plenum 63 and air inlet plenum 65 connect to a plurality of animal cages, not shown, within ventilated rack of animal cages 20. Ventilated rack of animal cages 20 can be a conventional ventilated rack of animal cages system such as ventilated rack animal cage systems manufactured by Allentown Caging Equipment Co., Allentown, N.J. as Model No. MS71 ISR140MVP. In an alternate embodiment, upper housing 16b connects to a drop from an air supply blower coupled to the ventilated rack of animal cages 20 rather than central exhaust and air supply system 17.

Device 10 can be permanently connected to each drop 16 of exhaust and air supply system 17 to continuously display operating conditions of each drop 16. Alternatively, device 10 is removably connected to one of drops 16 of exhaust and air supply system 17 as a sentinel control 30 and is moved between other ones of drops 16 of exhaust and air supply system 17.

Figure 5A:
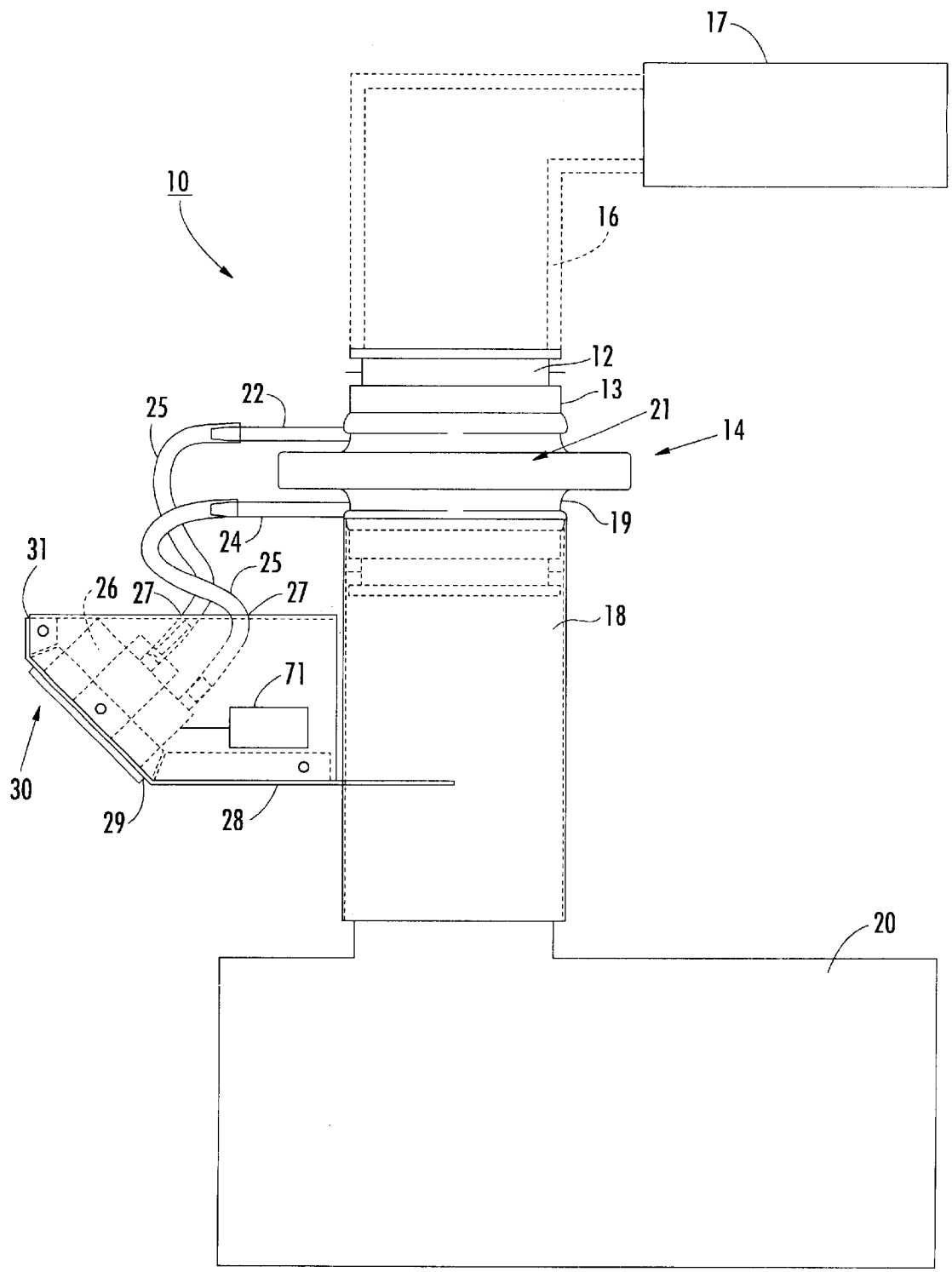
FIG. 5A is a side perspective view of an alternate embodiment of the device.
Figure 5B:
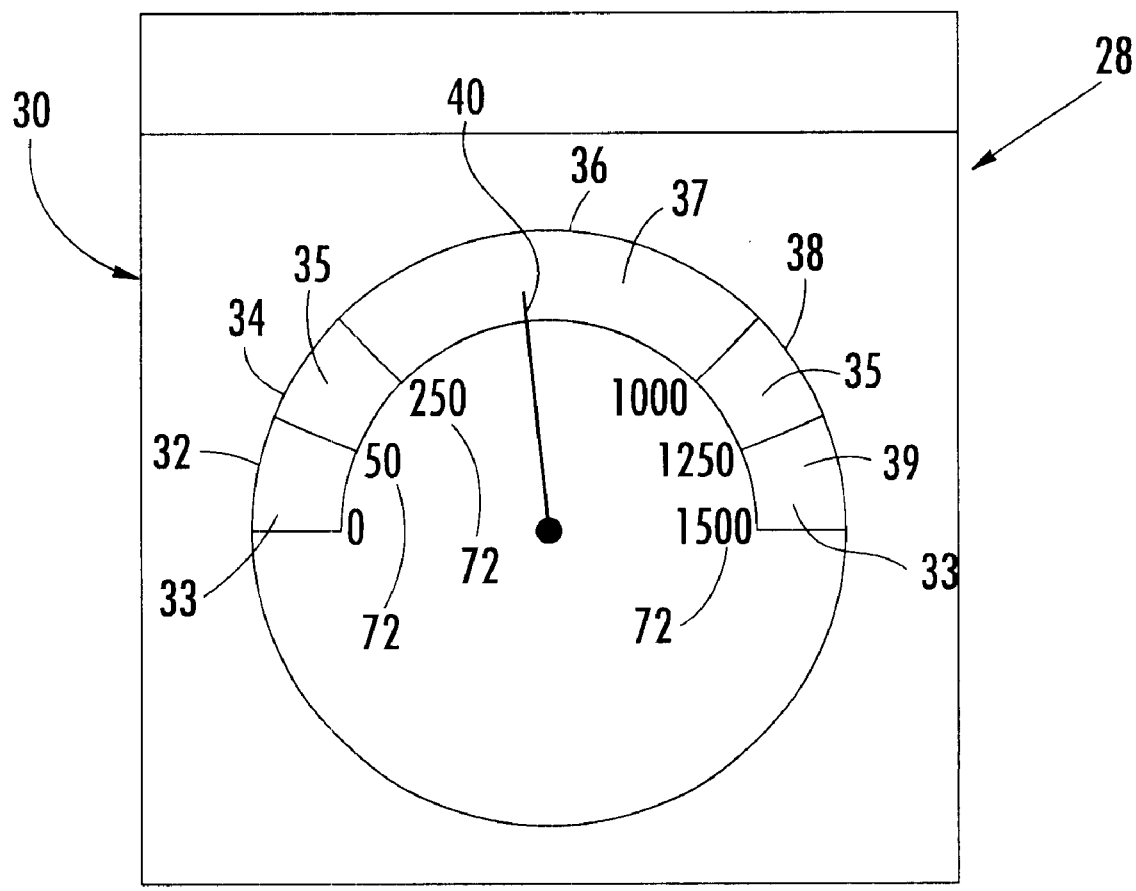
FIG. 5B is a front plan view of a display of the device shown in FIG. 5A.

In an alternative embodiment shown in FIG. 5A and FIG. SB, a differential pressure gauge 26 is coupled to conversion means 71 for converting the differential pressure measurement to an air flow rate. Display 30 includes indicia 72 of numerical values corresponding to a conversion of the differential pressure measurement into a flow rate. For example, indicia 72 can be in the range of about 50 to about 1500 cubic feet per minute. Portion 32, portion 34, portion 36, portion 38 and portion 39 are adjusted based on determined operating ranges for different sizes of damper 14.

It is understood that the above-described embodiments are illustrative of only a few of the many possible specific embodiments which can represent applications of the principles of the invention. Numerous and varied other arrangements can be readily derived in accordance with these principles by those skilled in the art without departing from the spirit and scope of the invention.

We claim:

1. A device for displaying a condition of air flow to or from a ventilated rack of animal cages comprising:

a damper adapted to be coupled between a drop of an air flow system and said ventilated rack of animal cages;

means for measuring pressure within said damper, and a display for visually displaying a condition of the measured pressure.

2. The device of claim 1 wherein said display includes a plurality of portions corresponding to a plurality of conditions of the measured pressure and a movable needle for pointing to a position within said portions.

3. The device of claim 2 wherein a first of said portions is a first color indicating a first condition having said value of the measured pressure outside of an operating range.

4. The device of claim 3 wherein the first color is red.

5. The device of claim 3 wherein a second of said portions is a second color indicating a second condition having said value of the measured pressure within an operating value.

6. The device of claim 5 wherein the second color is green.

7. The device of claim 5 wherein a third of said portions is a third color indicating a third condition having said value of the measured pressure at a boundary of said operating range.

8. The device of claim 7 wherein the third color is yellow.

9. The device of claim 1 further comprising:

an upper housing connected to an upper end of said damper, said upper housing adapted to be connected to said drop.

10. The device of claim 1 further comprising a lower housing connected to a lower end of said damper, said lower connected to said ventilated rack of animal cages.

11. The device of claim 1 wherein said damper includes an aperture therein and further comprising means for adjusting air flow rate by changing a size of said aperture.

12. The device of claim 11 wherein said means for adjusting said air flow rate comprises a plurality of movable plates surrounding an aperture and means for moving said plates, thereby changing the diameter of said aperture.

13. The device of claim 12 wherein means for adjusting air flow rate further comprises a lever arm coupled to mid plates, said lever arm being manually adjusted for adjusting said flow rate.

14. The device of claim 12 wherein said means for adjusting flow rate further comprises control means connected between said movable plates and said display, said control means automatically adjusting said movable plates depending on said condition.

15. The device of claim 11 wherein said means for measuring pressure within said damper comprises:
   an upper pressure port extending from an upper end of said damper positioned before said aperture;
   a lower pressure port extending from a lower end of said damper positioned after said aperture; and
   a differential pressure gauge connected to said upper pressure port and said lower pressure port, said differential pressure gauge measures differential between pressure from said upper pressure port and pressure from said lower pressure port.

16. The device of claim 15 further comprising tubing for connecting said upper pressure port and said lower pressure port to said differential pressure gauge.

17. The device of claim 16 further comprising a gauge housing having a first end attached to said ventilated rack of animal cages wherein said differential pressure gauge is positioned within said gauge housing.

18. The device of claim 17 wherein said display is coupled to a second end of said housing.

19. The device of claim 18 wherein said second end is angled inwardly from a top surface of said gauge housing.

20. The device of claim 19 wherein said top surface has a pair of apertures, one of said apertures receiving said tubing connecting said upper pressure port to said differential pressure gauge and one of said apertures receiving said tubing connecting said lower pressure port to said differential gauge.

21. The device of claim 15 wherein said display includes indicia of numerical values corresponding to said value of said measured differential pressure.

22. The device of claim 15 further comprising means for converting said differential pressure to a flow rate and wherein said display includes indicia corresponding to said flow rate.

23. The device of claim 1 wherein said air flow system supplies air to said drop.

24. The device of claim 1 wherein said air flow system receives exhaust from said drop.

25. The device of claim 1 wherein said device further comprises a plurality of said drops.

* * * * *